Jan. 15, 1957  L. B. EHRLICH ET AL  2,777,688
WINDOW OPERATING MECHANISM
Filed June 15, 1951  2 Sheets-Sheet 1
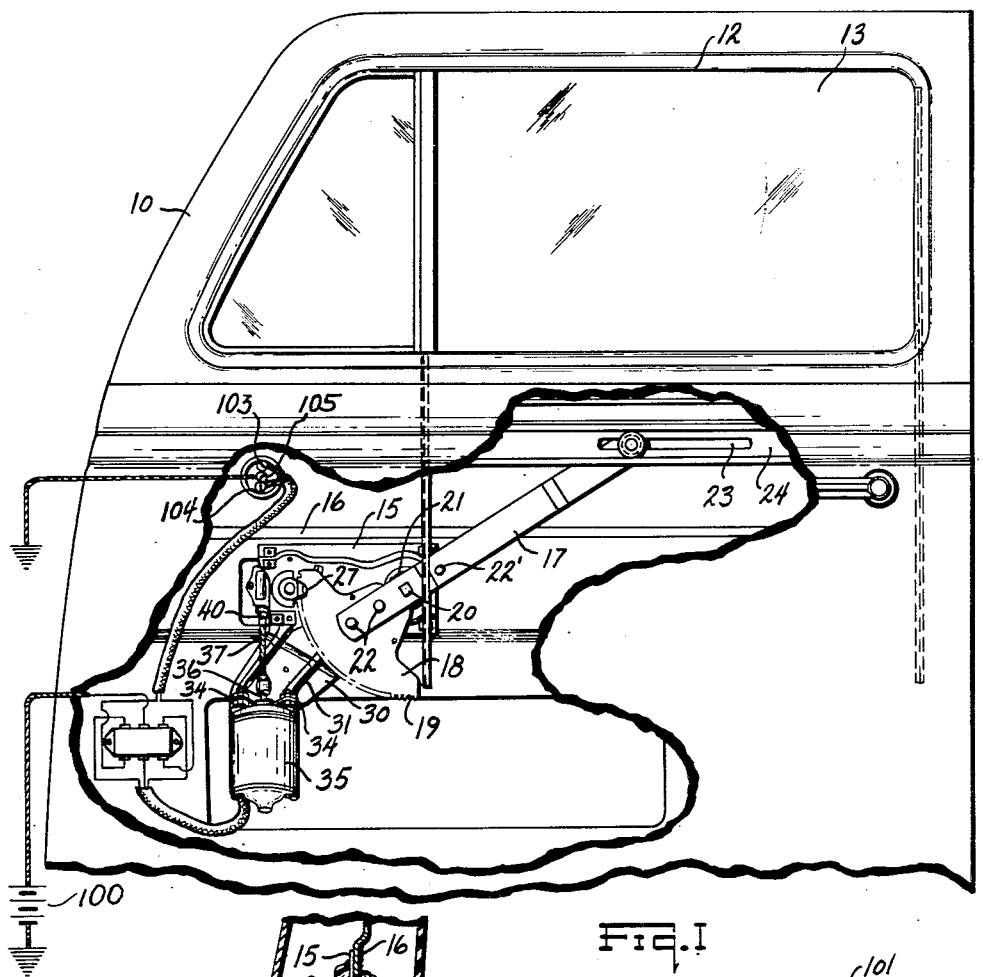
Fig. I
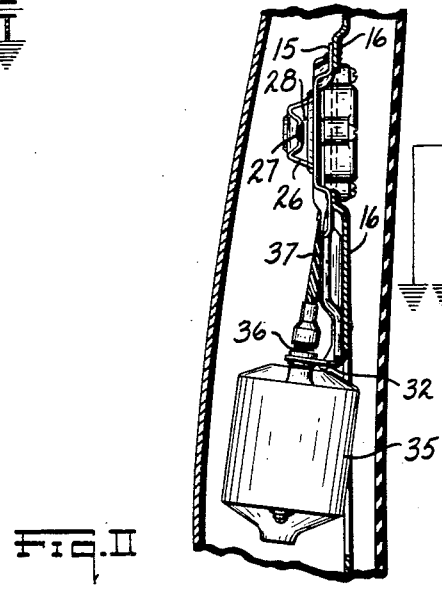
Fig. II
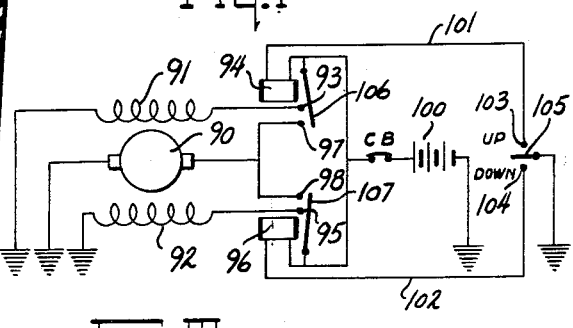
Fig. III
INVENTORS.
Louis B. Ehrlich
Herbert I. Chambers
BY
Fulwey, Souther & Stoltenberg
ATTORNEYS

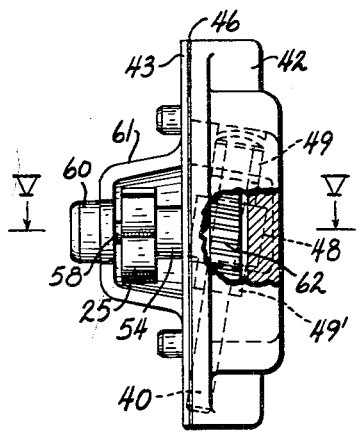
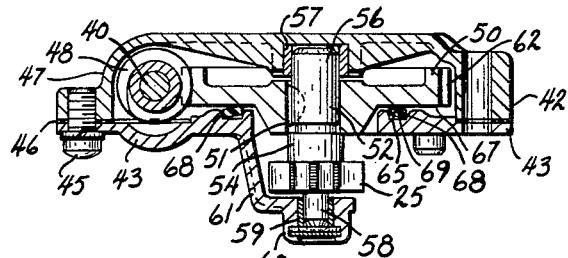
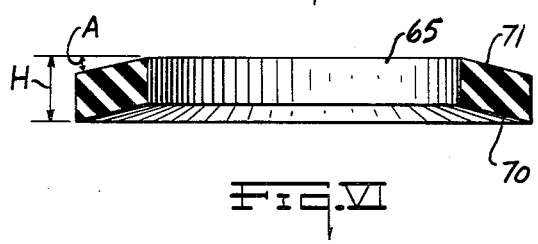
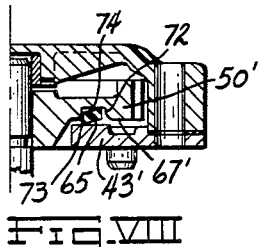
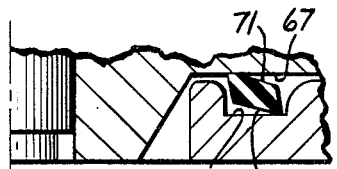
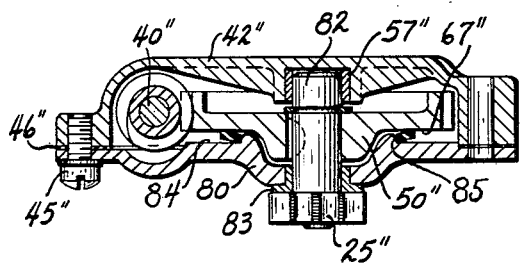
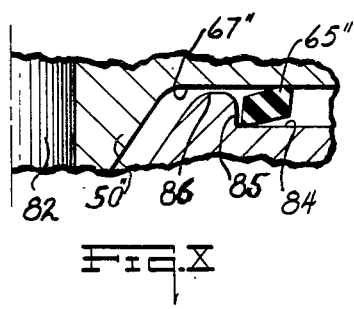

United States Patent Office 2,777,688
Patented Jan. 15, 1957

2,777,688

WINDOW OPERATING MECHANISM

Louis B. Ehrlich and Herbert I. Chambers, Toledo, Ohio

Application June 15, 1951, Serial No. 231,752

9 Claims. (Cl. 268—124)

This invention relates to a closure operating mechanism and more particularly, though not exclusively, to a power operated unit for actuating windows of self-propelled vehicles.

The invention comprehends a mechanism for raising or lowering windows of automobiles in which the operating parts are protectively housed and effectively lubricated, so that they will withstand continuous operation without impairment or undue wear and wherein the ingress of foreign matter is prevented.

The invention contemplates a sealed and self-contained power transmission unit of very small size adapted to be actuated by a small electric motor that will permit the installation of the entire power-operating mechanism with various conventional window regulators of the manually operable type without requiring special supports or vehicle doors of considerable thickness.

The invention embraces a sealing arrangement for relatively movable parts of a gearing assembly which compensates not only for inaccuracies of manufacture and for relative axial movement therebetween but for differences in the coefficient of expansion excluding the ingress of foreign matter and precluding the escape of lubricant from the assembly.

The invention includes a deformable member which, due to its special shape and contour, as well as its cooperative relationship with relatively movable parts provides a very effective seal therebetween.

The invention comprises a very small balanced and relatively quiet operating mechanism with all the actuating parts effectively lubricated and protectively enclosed in a compact sealed housing which permits ready access thereto.

According to the foregoing summary of the invention, indicating the general nature and substance, its main objective is to provide a mechanism in which an electric motor of small size is connected to a load through a very small, compact, and effectively-sealed lubricant-containing transmission unit. The component parts of the unit are correlated and arranged to provide ample bearings for a rotating shaft and novel sealing means therefor, the sealing means operating at relatively low contact pressure between relatively movable surfaces disposed substantially at right angles to the axis of rotation, so that maximum utilization of space within the unit is secured and the overall dimensions, particularly the width of the unit, is materially reduced over a unit incorporating a conventional seal.

Conventional seals between parts having relative rotary motion employ some form of assembly which incorporates stationary packing material placed under compression to fill the clearance between the rotating or power shaft and the surrounding stationary part or casing wall. If the packing material is placed under sufficient compression so as to engage the surface of the movable member or shaft sufficiently to assure a proper seal, there is a material loss of energy because of the friction set up between the rotary shaft and the stationary packing material. In fact, the rubbing of the packing material on the movable surface frequently results in the grooving thereof as well as the disintegration of the packing material with the resultant loss of sealing relationship, thus requiring frequent reworking and replacement. Furthermore, it is extremely difficult to tighten up such packing and obtain even pressure due to tolerances of manufacture without rapid wear of the parts contacting the seal, so that adjustments and replacements are needed. The aforesaid need for frequent adjustment of the parts and replacement of the packing involves high labor and material costs, as well as loss of use of the unit when the same is being repaired.

It is an object of the invention to overcome and successfully cure the foregoing listed draw-backs and performance failures by providing a mechanism wherein the main operating parts are hermetically sealed and constantly lubricated to effectively operate under adverse conditions. The parts are sealed by using a non-metallic deformable member made of relatively soft elastomer or rubber-like material having a configuration adapted to be distorted to provide optimum sealing action at relatively low contact pressure in order to reduce to a minimum frictional resistance losses, and which inherently compensate for changes in dimensions due to temperature variations and tolerances in manufacture.

Another object of the invention is the provision of a transmission unit having a speed reduction gearing between the input and output shafts wherein the gear members are arranged with their axes of rotation in oblique relation whereby gear end thrust on the bearings is distributed and the unit occupies very small space.

Another object of the invention is the provision of a window actuating mechanism utilizing a reversible electric motor of a small size connected to a worm and worm-wheel drive, through which torque transmission is irreversible to prevent thereby movement of the window by vibration or by unauthorized persons, and wherein objectionable noises and losses due to mechanical friction are reduced to a minimum, increasing thereby the efficiency of the mechanism.

Another object of the invention is the provision in a window operating mechanism of an electric motor of a small size having low deceleration torque and small kinetic energy of rotation of the armature and parts rotated thereby, so that the motor can be stalled or stopped by the window reaching the end of its travel without binding or subjecting the mechanism to high stresses, so that the use of complex adjusting devices and limit switches is dispensed with.

Another object of the invention is the provision of a seal in the form of a cambered washer of resilient elastomer having a substantially rhomboidal cross-section adapted to be placed under compression between relatively movable surfaces and be distorted thereby to provide optimum sealing action with the minimum frictional resistance and drag.

Another object of the invention is to provide a transmission unit for a window-operating mechanism wherein the component parts of the unit are correlated and arranged to provide liberal bearings and an effective seal for a rotating shaft, the seal being obtained by a deformable washer operating between surfaces displaced from the longitudinal axis of the shaft, whereby a minimum overall width of the transmission unit is obtained.

A further object of the invention is the provision of a seal for relatively movable machine elements by utilizing a cambered washer of non-metallic, elastically-compressible, resilient, plastic adapted to be placed in compression and be distorted to effect a seal at low contact pressure and minimum frictional resistance.

A further object of the invention is the provisions in a transmission unit containing a lubricant of ample bearings for a rotating shaft and of an effective seal therefor which is secured by the use of a non-metallic cambered washer engaging coplanar surfaces normal to the axis of rotation of the shaft, whereby the overall width and other dimensions of the unit are not increased, so that the same occupies the minimum of space.

Other objects and advantages of this invention relating to the arrangement, operation and functions of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is a front elevation of an automobile door with portions broken away to show the invention applied thereto;

Fig. II is a vertical sectional view through the door showing the power-operating mechanism in side elevation;

Fig. III is a diagrammatic view of the electrical connections and circuit-controlling means for the electric motor;

Fig. IV is a side elevation of the transmission unit with portions broken away to show the relationship between the worm and worm wheel gearing;

Fig. V is a cross-sectional view taken along line V—V of Fig. IV looking in the directions of the arrows;

Fig. VI is an enlarged central sectional view through the sealing member of the invention;

Fig. VII is an enlarged sectional view of a portion of the unit shown in Fig. V;

Fig. VIII is a fragmentary sectional view showing a modification of the sealing arrangement shown in Figs. V and VII;

Fig. IX is a transverse view showing a modification of the transmission unit illustrated in Fig. V; and Fig. X is an enlarged fragmentary sectional view of the unit shown in Fig. IX.

The invention may be incorporated in any type of apparatus used for moving a part between selected positions and, for practical application of its principles, the same is illustrated as embodied in a window or closure actuating mechanism, using as motive means an electric motor rotatable in both directions. However, it is to be understood that the invention is not limited to the particular form illustrated and that it is contemplated to use the same with any other suitable motive and power transmission means and whenever the invention may be found to have utility.

Referring to the drawings, in Fig. 1 is shown an automotive door 10 having a window of the non-draft, ventilating type. The rear portion 12 of the window opening is adapted to be spanned and closed by a panel of suitable transparent material or a glass pane 13 vertically slidable. The window pane 13, which is shown in window-closing position, is mounted for reciprocatory movement within the window opening in vertically disposed guideways or channels and is adapted to be lowered into the usual well formed at the lower section of the door 10, within which is also housed the window-operating mechanism of the invention.

In the embodiment shown, the window-operating mechanism, including the window regulator, forms a unitary assembly carried by an embossed supporting base plate 15 detachably secured to the inner door frame or panel 16 by suitable means. The window regulator is shown as comprising a window-moving member or swinging arm 17 and a segmental gear 18 having a series of gear teeth 19 at its outer arcuate periphery. The segmental gear 18 is preferably stamped from sheet metal and lies flat at its inner side against the base plate 15, being mounted and retained on the stud 20, which is journaled on the base plate, as at 21 by flanging the end portions. The operating arm 17 is preferably stamped from sheet metal projecting radially from the gear segment 18 and is fixed thereto at points 22 and 22' spaced radially from the stud 20 in order to strengthen and give rigidity. Thus the arm 17 and gear segment 18 are mounted for limited rotation in both directions about the axis of the stud 20. The free end of the operating arm 17 is provided with a roller passing through a slot 23 in the channel member 24 located at the lower portion of the window, so that movement of the arm 17 imparted by the turning gear sector 18 will effect corresponding raising and lowering movements of the window, causing the roller to travel the distance of the slot. The segmental gear 18 is driven to swing the arm 17 in an upward and downward direction by having its gear teeth 19 in meshing engagement with those of the pinion or output member 25 of the power transmitting unit of the invention which is detachably mounted to the rear face of the horizontally embossed portion of the base plate by suitable means.

As particularly shown in Fig. II, the front surface of the horizontally embossed portion of the base plate 15 is provided adjacent its outer end with a truncated conical section 26 having a side opening 28 partially covered by a depending offset tongue 27 forming an enclosing hood substantially covering the meshing engagement of the gear teeth of the output member 25 of the transmission unit and of the gear sector 18. The offset tongue 27 is arranged to bear against the front face of the gear sector 18 to guide the same in proper meshing with pinion 25, insuring parallel relation between the base plate 15 and gear sector 18.

The supporting base plate 15 is preferably made of light stock and, in order to add strength to its laterally depending portion 30, the same is provided with spaced ribs 31 which extend longitudinally toward the upturned supporting ledge 32. Resiliently mounted by suitable vibration-proof members 34 upon the ledge 32 is the prime mover or reversible electric motor 35, preferably of the split-field shunt type, adapted to be energized by the automobile storage battery by having its circuits manually controlled by a suitable reversing switch accessible to the driver. The motor shaft 36 is connected by flexible shafting 37 to the input shaft 40 of the transmission unit permitting liberal adjustment therebetween, providing very effective means for adapting the power operating mechanism to various door construction as well as means to compensate for misalignment and tolerance in manufacture.

The transmission unit of the invention providing the means through which the motor shaft 36 is connected to the gear sector 18 in a speed-reducing relationship including the non-reversible torque-transmitting gears is in the form of a sealed assembly. In the form shown in Figs. IV to VII inclusive, the transmission unit comprises a composite housing formed by a shallow cup-like container part 42 and a cover or closure member 43 detachably secured to the cup by suitable means such as the threaded members 45 and sealed by a suitable gasket 46 arranged between the mating marginal surfaces of the cup and closure.

The container part 42 of the composite housing is of substantially cylindrical outer contour having a laterally projecting outer section 47 forming an inner side pocket of rectangular configuration projecting from an inner circular section. The side socket 47 accommodates the worm 48 and provides by its outwardly projecting parallel walls spaced supports for the angularly disposed bearings 49 and 49', upon which is journaled the driving or input shaft 40. The worm 48 is in meshing engagement with the worm wheel 50 secured by a suitable detachable means such as a Woodruff key 51 to the central section 52 of the output shaft 54 which is journaled at its inner end section 56 on a bearing bushing 57 supported on the bottom surface of the inner circular section of the container part 42. The output shaft 54, adjacent the portion upon which the pinion 25 is secured, has a reduced end portion 58 which is journaled on a bearing 59 formed on the topmost section 60 of the truncated conical section 61 formed on the central section on the cover member 43. As particularly shown in Fig. IV, the truncated conical section 61 is opened laterally to expose the pinion or output member 25 for effecting the driving connection or meshing engagement with the gear teeth 19 of the window operating sector 18.

In the preferred form of the invention, the gear teeth 62 of the worm wheel 50, as particularly shown in Fig. IV, are located at an angle with respect to its axis of rotation in order that the axis of rotation of both the input shaft 40, and of the worm 48, be disposed at an angle to the plane of rotation of the worm wheel 50 and thereby the input shaft is positioned obliquely with respect to the axis of rotation of the output shaft 54. By this arrangement, the end thrust of the worm 48 on the bearing members 49 or 49' is distributed and a material reduction in the distance between the parallel walls and hence the size of the side pocket 47 of the container part 42 is secured.

To fulfill the objectives of the invention in providing a very compact lubricant-containing and hermetically-sealed transmission unit, the container and closure parts are formed so that the inner walls of the composite housing closely fit the outline of the gear members, providing a small clearance for receiving a viscid lubricant such as grease, so that an effective and dependable lubrication for the operating parts is secured. In order to prevent the ingress of foreign matter into the composite housing, as well as the escape of lubricant between the housing and the output shaft, a very effective seal is incorporated. The seal of the invention is attained by a deformable cambered washer operating at low contact pressure between relatively movable surfaces displaced from the longitudinal axis of rotation of the shaft. Thus maximum utilization of the space within the housing is secured, and a transmission unit of minimum overall dimension, particularly in width, is obtained.

In the preferred embodiment shown in Figs. IV to VII inclusive, the sealing means of the invention comprise a cambered washer 65 of non-metallic, comparatively soft, resilient, and deformable material, which is placed under compression between relatively movable surfaces located substantially at right angles to the axis of rotation of the output shaft, such as the inner surface of the cover and the front face or planar surface 67 of the worm wheel member 50 in association with retaining means for guiding the cambered washer 55 in concentric relation with the axis of rotation of said shaft. The retaining means provided for guiding the sealing member 65 are illustrated in the form of an annular circular groove 68 having its bottom wall 69 coplanar with the front face 67 of the worm wheel member 50 and having a depth smaller than the height of the cambered washer 65, so that when the cover 43 is assembled on the container 42, the cambered washer 65 is under compression.

As best shown in Figs. VI and VII, the body of the sealing washer extends angularly from its inner to its outer periphery and thereby the surface of the lower face 70 adjacent its maximum diameter is in sealing engagement with the planar section 69 of the cover while the surface of its upper face 71 adjacent its smaller diameter is in engagement with the face 67 of the worm wheel 50. In carrying out the requirements of the invention, the sealing annulus or washer 65 is cambered or of a contour which provides divergent sealing surfaces or opposite sealing lips located at different radial distances from the axis of the rotating member. The invention can be best fulfilled when the sealing gasket is of diamond or rhomboidal cross-section and made from a relatively soft, compressible material, such as rubber or a soft elastomer, or a suitable resilient plastic having rubber-like characteristics ranging from 40 to 80 durometer hardness. Moreover, the size and contour of the sealing washer and of its retaining and guiding means should be correlated and arranged, so that diagonally opposite surfaces adjacent to the apex of the acute angles of the sealing washer are under compression and thereby distorted into direct engagement with the surfaces of the members sealed thereby without introducing friction in amounts that will impair efficient torque transmission.

Fig. VIII illustrates a modified arrangement of the sealing means of the invention in which the distortable sealing washer 65 is located in its upside down or reverse position from the one illustrated in Fig. VII. In this embodiment, the retaining and guiding means for the cambered sealing washer are in the form of an annular channel 72 provided on the front face 67' of the worm wheel 50'. The inner surface 73 of the cover 43' is coplanar with the bottom surface 74 of the channel 72 whereby the surface of the sealing washer adjacent its maximum diameter is in contact with the surface 74 of the channel, while the surface and the opposite side adjacent its smaller diameter is in engagement with the planar surface 73 of the cover.

In the form of the invention shown in Fig. VIII, it is also contemplated that the height H of the uncompressed cambered washer should be greater than the distance between the coplanar relatively movable surfaces 73 and 74 while its thickness should be smaller than such distance. Moreover, it is also contemplated that the body of the uncompressed sealing washer should form an angle A with the horizontal ranging between 20 to 40 degrees, preferably 30 degrees, and that the depth of the channel 72 should be equal and preferably slightly greater that the thickness of the cambered sealing washer. The fulfillment of these requirements will provide an effective seal by placing under compression the sealing washer and thereby causing engagement at relatively low contact pressure of diametrically opposed surfaces of the sealing washer at different radial distances with the coplanar relatively movable surfaces 73 and 74 formed on the cover 43' and the worm wheel 50'.

Figs. IX and X illustrate another form of the transmission unit of the invention in which the operative parts interposed between the input and output shafts supplying the speed reduction are similarly supported and arranged within a modified composite housing as the worm and worm wheel illustrated in Figs. IV to VII inclusive. In this embodiment, the composite housing comprises a cover member 80 of modified construction and a shallow cup-like container 42" having the same contour and including the provisions for supporting the input shaft 40' disclosed in the other forms of the invention. The container part 42" is provided with a bearing bushing 57" which supports the inner end of the output shaft 82, upon which is mounted the worm wheel 50" by suitable detachable means. The open end of the container 42 is fully covered and closed by the cover 80 which is detachably secured by suitable means such as the threaded members or screws 45" and sealed by a gasket 46" arranged between their mating marginal surfaces.

The cover 80 supports the output shaft 82 at a point located between the worm wheel 50" and the output member or pinion 25" on a radial and thrust bearing bushing 83 preferably of the self-lubricating type. The transmission unit incorporates another form of the sealing means of the invention, particularly with respect to retaining and guiding means therefor. Referring to Fig. X, the sealing means comprise a cambered washer 65" of non-metallic, comparatively soft, resilient, and deformable elastomer which is placed under compression between relatively movable surfaces located at a radial distance from the axis of rotation of the output shaft 82. As shown, the sealing washer is compressed between the front face or planar surface 67" of the worm wheel 50" and the coplanar surface 84 formed on the inside of the cover member 80, and is retained in position by a modified form of guiding means which prevent its radial displacement.

The guiding means provided for the sealing cambered washer 65" are shown in the form of an inwardly projecting cylindrical surface or flange 85 having a diameter slightly smaller than the inner diameter of the washer and being coaxial with the output shaft 82. The cylindrical surface 85 is formed on the outer wall of the projecting boss 86 which forms the central section of the cover adjacent to the planar surface 84. It can be seen that the cylindrical wall or flange 85 effectively retains the sealing washer 65" in concentric relation with the shaft and prevents its radial displacement. In this modified form of the invention the correlation and arrangement of the guiding means 85 and cambered sealing washer 65" is such that the sealing washer 65" provides a seal for the output shaft 82 which effectively prevents leakage of the lubricant, so that the transmission unit is sealed with an amount suitable to last throughout the life of the unit.

It can be seen, upon examination of the various forms of the invention, that the sealing means disclosed provides a seal wherein the sealing member is not tightly held by its guiding or retaining means and in which its sealing lips contact the relatively movable members being sealed at different radial distances. Moreover, it should be noted that by the simple expediency of reversing the position of the ring-like seal with respect to the members being sealed, the radial relationship of its sealing lips is reversed, so that the coplanar surfaces of the relatively movable members are engaged by the sealing lips at points having entirely different radial distances than those which are engaged when the sealing member is in its original position.

It is contemplated by the invention that the sealing member 65 may be fabricated from a tubular member of rubber or like material having the characteristics and hardness hereinbefore outlined. This can be effectively accomplished by causing relative rotation between the tubular member and a cutting tool, which may have a single or a plurality of spaced cutting elements, and by moving radially the cutting tool at an angle ranging from 20 to 40 degrees with a plane perpendicular to the axis of rotation; and after the withdrawal of the cutting tool from engagement with the tubular member, causing relative longitudinal movement therebetween to produce severed sections of ring-like cambered configuration having a rhomboidal or diamond cross-section. By this method, the thickness and height of the sealing member can be effectively controlled through changes in the spacing between the cuts or in the spacing of the cutting elements as well as in the angle of the cut without materially changing or impairing its diamond or rhomboidal cross-section. In addition, the cambered sealing washer may be manufactured by molding, in suitably shaped dies, an elastomer or resilient plastic so as to produce a compressible sealing washer of cambered configuration having a diamond or rhomboidal cross-section as shown in Fig. VI.

The high reduction ratio obtained between the input and output shafts by the transmission unit of the invention housing the worm and worm wheel gear train serves to provide considerable reduction in the rotary movement, increasing the mechanical advantage for operating a load such as the window pane 13. Thus a prime mover or motor can be effectively used for rapid movement of the window in which the armature has a rotating speed in the range of 3,000 to 4,000 R. P. M.

One important feature of the invention is manifested by the utilization for the power source or prime mover 35 of a reversible electric motor of small size having relatively high rotating speed. The motor 35 is designed to provide the proper speed-torque characteristics for operating the window pane 13 through the gear reduction of the transmission unit, using a motor armature having a very low polar moment of inertia. The main objective in the motor design is to provide the required torque characteristics with a motor armature having low polar moment of inertia, so that the same has low deceleration torque and a small kinetic energy of rotation. Thus the motor can be stalled or stopped by the window reaching the end of its travel without binding or jamming, or subjecting the parts associated therewith to high stresses. The type of armature contemplated, having very low polar moment of inertia, may be obtained by reducing to a minimum its diameter and decreasing its peripheral mass using maximum magnetic tooth densities, especially at those sections adjacent to the outer diameter of the armature.

It can be seen, from the foregoing, that it would only be necessary for the automobile driver to move the manually operating switch to impart the desired movement to the window pane to cause the energization of the electric motor whereby its armature shaft 36 will actuate the input shaft 40 causing the operation of the output shaft 52 and hence of the pinion or output member 25 to operate the sector 18 and swing the arm 17 to move the window pane 13 in the desired position. In the form of the invention shown, the energization of the motor is carried out through the actuation of suitable relays and circuit breaker which are housed as a unit supported within the window well adjacent the motor 35.

As diagrammatically shown in Fig. III, the electric motor 35 is of the split field shunt type, comprising the rotatable armature 90 and shunt field coils 91 and 92 in which one terminal of each of the field coils, as well as a commutator brush, is suitably grounded. The live terminal of the field coil 91 is connected to the contact 93 of the relay 94 while the live terminal of the field coil 92 is connected to contact 95 of the relay 96. The non-grounded brush is connected by suitable leads to the contact 97 of the relay 94, as well as to the contact 98 of the relay 96. One terminal of each of the operating coils of the relays 94 and 96 are connected by suitable leads to the circuit breaker CB and hence to the automobile storage battery 100, which has one terminal grounded. The other terminal of the operating coils of the relays 94 and 96 are connected respectively by suitable leads 101 and 102 to the switch terminals 103 and 104 of the main controlling switch provided with a manually operable contact plate 105 which, in turn, is grounded. The armature 106 of the relay 94 is connected through the circuit breaker CB to the battery and is adapted to manually engage contacts 93 and 97, while the armature 107 of the relay 96 is also connected to the battery through the circuit breaker and is adapted to mutually engage the contacts 95 and 98.

It can be seen that manual movement of the switch blade 105 into engagement with either of the switch contacts 103 or 104 will cause the energization of the corresponding operating coil of the relays 94 or 96 to attract either of the armatures 106 or 107, whereby the motor armature 90 will be selectively connected in shunt with the field coils 91 or 92, causing the rotation of the motor shaft 36 in the desired direction. The rotation of the motor shaft 36 in the desired direction will impart rotation through the flexible shafting 37 to the input shaft 40 of the power-transmitting unit and hence to the output member 25 to drive the window regulator for imparting motion to the window pane 13 in the selected direction.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. A window operating mechanism comprising an oscillatable member having connections with the window pane for moving the same between selected positions, a reversible electric motor, a lubricant containing sealed casing, an input shaft journaled within the casing adapted to be connected to said electric motor, an output shaft supported in the casing extending to the exterior, a pinion connected to the external portion of the output shaft and adapted to be connected to the oscillatable member, a worm wheel fixed to the output shaft located within said casing for driving said pinion, a planar section formed on the worm wheel at substantially right angles to the axis of rotation of the output shaft, a planar surface formed on the casing in parallel relation to said planar section, a worm meshing said worm wheel providing a speed reduction and being connected to said input shaft within said casing, a cambered sealing washer of compressible resilient material having its body extending angularly from its inner to the outer periphery so that diametrically opposed surfaces of its upper and lower faces are only engaging respectively the planar section of said worm wheel and the planar surface of the casing adjacent thereto at different radial distances from the axis of rotation of the worm wheel to provide a seal between the output shaft and the housing, and means in said casing projecting at one end of its planar surface for loosely retaining said sealing washer in concentric relation with the axis of rotation of the worm wheel.

2. A window operating mechanism, comprising a member connected to the window pane for moving the same between selected positions, a reversible electric motor, a sealed casing, an input shaft actuated by said electric motor journaled within said sealed casing, an output shaft extending to the exterior of the sealed casing and being journaled within the casing, a pinion driven by the external portion of said output shaft and adapted to be connected to the window moving member, a worm wheel connected to the output shaft located within said casing for operating said pinion, said worm wheel and casing formed with substantially parallel planar surfaces located at right angles to the axis of rotation of the output shaft, a worm meshing said worm wheel, said worm driven by said input shaft, a sealing member of non-metallic compressible material in the form of an inherently resilient cambered washer of rhomboidal cross-section for solely engaging at different radial distances from the axis of rotation of the worm wheel the planar surface of the worm wheel and the planar surface of the casing adjacent thereto with divergent portions of its opposite faces and a cylindrical projecting flange having a smaller diameter than the inner diameter of said washer located at one end of the planar surface of said casing for loosely retaining said cambered washer in concentric relation with the axis of rotation of the worm wheel providing thereby a seal between the output shaft and casing by the engagement of the sealing members with said planar surfaces at different radial distances from the shaft.

3. A window operating mechanism comprising an oscillatable member having connections with the window pane for moving the same between selected positions, power operated means, a lubricant containing sealed casings, provided with a stationary planar surface, an input shaft driven by the power operated means, said input shaft extending into the interior of the sealed casing and being journaled therewithin, an output shaft journaled within the casing and having an external portion, a rotatable member connected to the oscillatable member driven by the external portion of the output shaft, a worm wheel within the casing driven by the output shaft for operating said rotatable member, a planar section normal to the axis of rotation of the output shaft formed on the face of said worm wheel parallel to said planar surface, a worm meshing said worm wheel within the casing, said worm being connected to said input shaft, and a sealing washer of compressible resilient elastomer loosely positioned in concentric relation with the output shaft, and the body of the sealing washer extending angularly from its inner to its outer peripheries for engaging at different radial distances from the axis of rotation of the output shaft by its inner and outer peripheral surfaces of its upper and lower faces respectively the planar section of the worm wheel and the stationary planar surface of the casing adjacent thereto to provide a sealing action at different radial distances from the output shaft.

4. In a device of the class described, a liquid seal for adjacent parallel planar surfaces formed respectively on a member fixed to a rotating shaft and the inner wall of its supporting housing, an inherently elastic sealing member positioned under compression between said surfaces, said sealing member having a substantially rhomboidal cross-section, the diagonally-disposed portions of the upper and lower faces of the sealing member adjacent the apex of the acute angles of the rhomboidal cross-section contacting only said parallel planar surfaces at different radial distances from the axis of rotation of said shaft to provide a seal between the shaft and housing, and means on one of said planar surfaces projecting toward the other planar surface for loosely restricting the movement of the said sealing element without transversely compressing said sealing member.

5. In a device of the class described, a transmission unit adapted to be connected between motor means and a window moving member said transmission unit comprising a sealed casing having a uniplanar surface, input and output shafts journaled in the casing, driving means interconnecting the output shaft and the input shaft in a speed-reducing relation, a planar section parallel to the casing planar surface formed on the driving means connected to the output shaft, a cambered inherently elastic sealing washer of compressible resilient plastic loosely held in the casing in concentric relation with respect to the axis of rotation of the output shaft by an oversize annular groove with a coplanar bottom wall formed on one of said planar surfaces, and the diagonally opposite surfaces of the upper and lower faces adjacent to the inner and outer peripheries of the cambered washer engaging solely the planar section of the driving means connected to the output shaft and a stationary planar surface of the casing adjacent thereto providing a lubricant seal therebetween at different radial distances from the axis of rotation of the output shaft.

6. In a device of the class described, a transmission unit comprising a sealed casing, a planar surface formed on a stationary surface of the casing, input and output shafts journaled within the casing, driving means rotating the output shaft by the input shaft in a speed-reducing relation, a planar section located at right angles to the axis of rotation of the output shaft formed on the driving means rotated thereby and parallel to said planar surface, the input shaft positioned obliquely with respect to the axis of rotation of the output shaft, a sealing washer of compressible resilient material loosely retained between said planar parallel surfaces, the body of said washer extending angularly whereby diagonally opposite surfaces of the upper and lower faces adjacent the inner and outer peripheries of the sealing washer engage solely the planar section of said driving means connected to the output shaft and the planar surface formed on the stationary surface of the casing adjacent thereto at different radial distances from the axis of rotation of the output shaft providing thereby a seal between the output shaft and casing.

7. A window operating mechanism comprising an oscillatory member operable for moving the window closure between selected positions, motor means, a sealed casing having a cover provided with an inner planar surface, an input shaft extending from the exterior into the interior of the sealed casing and being journaled within the casing, flexible shafting connecting the input shaft to said motor means, an output shaft having a pinion adapted to be connected to the oscillatory member, a worm in the interior of the casing driven by said input shaft, a worm wheel meshing with said worm, said worm wheel fixed to said output shaft for driving said pinion, a planar section parallel to said planar surface formed on the face of the worm wheel, a sealing member of a compressible elastomer in the form of a cambered washer engaging solely the planar section of the worm wheel and the planar surface of the cover adjacent thereto at different radial distances from the axis of rotation of the output shaft to provide a seal between said casing and output shaft, and transverse projecting wall at each end of the planar section of said worm wheel for loosely retaining said cambered washer in concentric relation with the axis of rotation of the output shaft.

8. A sealing assembly for a rotatable shaft located within a housing and projecting through an aperture formed in one of the walls thereof, comprising a washer of non-metallic elastically compressible material, the body of the gasket extending angularly from its inner to its outer periphery providing a cross-section having a substantially rhomboidal configuration, a planar surface formed on a member rotatable with said shaft, a planar surface having a parallel relationship with the first mentioned planar surface formed on the interior wall of the housing adjacent to its aperture providing a space between said rotatable member and housing, the body of the washer located between said parallel planar surfaces and extending angularly in said space forming by portions of its upper and lower faces diametrically opposed sealing lips solely engaging respectively said parallel planar surfaces at different radial distances from the shaft, and the height of the uncompressed washer being greater than the space between the parallel planar surfaces of said rotatable member and said housing.

9. A sealing assembly for a rotatable shaft located within a housing and projecting through an aperture formed in one of the walls thereof, comprising an annulus of relatively soft compressible elastomer having its upper and lower faces extending angularly from its inner to its outer periphery providing a cross-section having a substantially rhomboidal configuration, a planar surface located at substantially right angles to the axis of rotation of said shaft formed on a member fixed for rotation with said shaft, a planar surface formed on the interior wall of the housing adjacent to its aperture providing a space between said planar surfaces, said annulus loosely located in said space and extending angularly therein providing by portions of its upper and lower faces diametrically opposed sealing lips solely engaging respectively said planar surfaces at different radial distances from the shaft, and means on one of said planar surfaces for loosely guiding said annulus adjacent said shaft.

References Cited in the file of this patent

UNITED STATES PATENTS

| 1,049,255 | Merritt | Dec. 31, 1912 |
| 1,839,368 | Baum | Jan. 5, 1932 |
| 2,047,329 | Petersen | July 14, 1936 |
| 2,186,664 | Brown | Jan. 9, 1940 |
| 2,324,145 | Floraday | July 13, 1943 |
| 2,331,260 | Wiseman | Oct. 5, 1943 |
| 2,336,250 | Hein | Dec. 7, 1943 |
| 2,593,410 | Buckendale | Apr. 22, 1952 |
| 2,684,847 | Barden | July 27, 1954 |

FOREIGN PATENTS

| 353,096 | Great Britain | July 23, 1931 |
| 544,458 | Great Britain | Apr. 14, 1942 |
| 596,089 | Germany | May 3, 1934 |